United States Patent Office 2,764,499
Patented Sept. 25, 1956

2,764,499

METHOD OF MAKING A WAX AND CLAY DISPERSION

Rotheus B. Porter, Jr., Darien, Conn., assignor to American Cyanamid Company, New York, N. Y., a corporation of Maine No Drawing. Application June 26, 1952,
Serial No. 295,829

3 Claims. (Cl. 106—272)

The object of this invention is a process of making wax and clay dispersions and their use in the manufacture of shaped articles from finely divided particulate matter. More particularly, the present invention relates to aqueous wax emulsions and dispersions containing substantially the minimum effective amount of an anionic or non-ionic dispersing agent, the incorporation of the emulsions or dispersions into mixes of finely divided particulate matter such as clay, glass, and metal oxides, and the formation of shaped bodies therefrom.

As used in this specification, the term "emulsion" designates a suspension of liquefied wax droplets in a continuous aqueous phase, and the term "dispersion" designates a suspension of solid wax particles in a continuous aqueous phase. It will be understood that for the purposes of the process of the present invention the two terms are substantially interchangeable. The dispersions may be changed to emulsions by heating, and the emulsions may be changed to dispersions by cooling. Substantially identical results are obtained in either event.

Although numerous procedures for the formation of shaped bodies from the above described finely divided particulate matter are known, there are only two of commercial importance, both comparatively new. As ordinarily employed, both methods are performed automatically on high speed machines.

In the first or "wet" method, applicable where the mixture of finely divided particulate matter is a water-containing plastic mass such as a ceramic maker's clay mixture, two steps are required. In the first step, the plastic mixture is extruded and the extrusion is cut into appropriate lengths or blanks. In the second step, the lengths or blanks are formed into shapes by turning, grinding, drilling, etc. as may be desired. Thereafter the shapes are fired in kilns.

In the second or "powder" method, only one step is necessary. In this step the finely divided particulate matter, usually containing a binder, is subjected to compression molding at high pressure in a mold of the appropriate shape. The article is ejected from the mold and usually but not necessarily fired. In this method, particularly where a ceramic material is used, the article is frequently strong enough to be used directly, as in the case of flower pots, but if additional strength is desired it may be fired in a kiln. By the use of this method, vitreous shapes may be produced from powdered glass or clay and, where the firing is performed in a reducing atmosphere, metal shapes may be produced as well.

The size of the particles employed in the processes described above varies widely. In the case of the clays, the size of the particles may be 1 micron or less where plastic mixes are desired. On the other hand, in the production of certain wares, much coarser clays may be employed, up to 10 or 15 microns. In the case of glass and metal oxides, the particle size may be still larger, ranging up to 40–60 microns or roughly 325 mesh. The dispersions of the present invention give good bonding where even still larger particles are employed. Such large particles find use in the production of highly porous ware such as sintered metal forms used as filter cups, and silicon carbide aggregates used in the manufacture of grinding wheels.

It will be understood that in the wet method, the extruded plastic must have sufficient green strength, that is, it must be sufficiently strong and rigid, to withstand the machining steps described. It will further be understood that in the powder method it is very desirable for the molding compounds to contain one or more materials which will lubricate the particles while they are being molded, which will promote their free release of the article from the mold, speeding the operation and avoiding the production of defective products. In the powder method as well, it is necessary that a firm bond be established between the particles to provide satisfactory green strength.

In the past, it has been proposed to accomplish these objectives by incorporating organic oils with the particulate matter prior to the forming operations described. Such oils, particularly when incorporated in the form of an emulsion, act as valuable lubricants during the forming operations. In the wet process these oils permit faster, easier and more accurate machining. In the powder method the oils provide better flow of the powder in the mold, promote quick and clean release of the shapes from the mold, and improve the green strength of the pieces thus formed.

These oils are preferably incorporated by kneading wet or dry finely-divided particulate matter with an appropriate emulsion in a heavy-duty mixer such as a dough mixer, until a homogenous blend results. When it is desired to form shaped articles by the wet method, the plastic mixture, after incorporation of the wax dispersion, is extruded in the desired shape, cut into lengths, and machined as described. When it is desired to employ the "dry" process, the kneaded product is dried, pulverized, and screened, and the dry oil containing powder thus obtained is molded under high pressure.

Emulsions previously used for this purpose have been prepared by the use of excessively large amounts of emulsifying agent, that is by the use of amounts of emulsifying agent far in excess of that necessary to emulsify the oils employed. So far as is known, invariably at least 10% of emulsifying agent has been used, based on the weight of the oil. Frequently much more, up to 30%, has been considered necessary for best results, apparently in the belief that this amount of emulsifying agent was necessary to maintain the stability of the emulsion in the presence of the clay or other particulate matter, while providing optimum lubrication and green strength.

The discovery has now been made that the use of such large proportions of emulsifying agent is not at all necessary. The further discovery has now been made that the use of these excessive amounts of emulsifying agent is, so far as observed, disadvantageous. The still further discovery has been made that when the amount of emulsifying agent used is substantially the minimum amount necessary to cause formation of an initially stable emulsion, the emulsion is sufficiently stable during its use for the purposes intended and, when employed as hereinafter described, yields mixes of improved characteristics. It has been found that emulsions containing this minimum amount of dispersing agent cause the mixes to show better lubrication, better flow, and better green strength than emulsions which contain the higher proportions of emulsifying agent previously thought necessary. It has finally been found that the normally solid waxes, that is, the waxes which are solids below about 110° F., yield superior results as contrasted with the normally liquid oils previously employed.

According to the present invention, a normally solid wax is selected having a liquefying point between 110° F.

and 200° F. and is heated to about 10°–20° F. above its liquefying point. The liquid wax is poured with rapid stirring into water having about the same temperature and containing substantially the minimum effective amount of an anionic or non-ionic surface active agent to effect emulsification of the wax employed.

Alternatively, the emulsifying agent may be mixed with the liquid wax, and the mixture poured into the water with similar rapid stirring. In either instance an emulsion rapidly forms, which is passed through a colloid mill or an orifice-type pressure homogenizer to reduce the particle size of the droplets of wax to colloidal dimensions, that is, to 1 or 2 microns or less in size. On cooling, the particles of wax solidify, forming a stable, homogeneous dispersion of the wax in the water.

In the specification and claims, the word "wax" is used in its normal sense to designate any of the plastic, amorphous or crystalline compositions generally denominated as such having a liquefying point between about 110° F. and 200° F. and which leave substantially no ash on calcination at 500° C. Waxes having a lower liquefying point frequently melt during hot weather and therefore tend to lose some of their bonding effect, while waxes having a melting point in excess of about 200° F. are unduly difficult to emulsify with water and offer no off-setting advantages.

So far as is known, any of the ordinary materials customarily denominated as waxes may be used with good results. These include refined or crude paraffin wax, microcrystalline wax, ozocerite, and waxes of the montan type which contain carboxylic radicals. The waxes may also be compounds of the ester type such as candelilla wax or carnauba wax, of the alcohol type such as octadecanol, of the amide type such as the fatty acid amides, or the higher melting point halogenated derivatives of any of the aforementioned waxes.

The hard waxes, particularly those of the mineral type, are employed principally for improving the green strength of plastic mixtures which are normally extruded, and then shaped by machining or grinding. The microcrystalline waxes, of mineral or petroleum origin, are generally tougher and more flexible and are preferred for use in the dry process. Other waxes impart different combinations of properties, and in each instance selections of any particular wax selected is governed by the combination of beneficial properties it is desired to impart.

As dispersing agents, any non-ionic or anionic dispersing agent may be used. Thus, there may be employed sodium lignin sulfonate, amine caseinates, polyvinyl alcohol, the soaps of fatty acids, and the sulfonate and sulfate type dispersing agents in general. As non-ionic surface active agents may be employed, the polyglycol ethers, the reaction product of a long chain alcohol with about 20–50 mols of ethylene oxide, or the essentially non-ionic type of dispersing agents formed by the reaction of tall oil acids with ethanolamine and the condensation of the amide thus obtained with ethylene oxide as described and claimed in copending application 177,176 of J. J. Carnes et al., filed on August 4, 1950.

When desired, the normal amount of one or more antiseptics may be incorporated in the emulsion. In addition, one or more introfiers may be incorporated. Thus a small amount of a sodium polychlorophenate, preferably sodium pentachlorophenate, may be added as the antiseptic and an alcohol of the type of octadecanol may be employed as introfier.

The waxes, surface active agents, preserving agents and stabilizing agents and emulsifying procedures have been recited broadly, as they form no part of the present invention.

The minimum effective amount of dispersing agent which should be used in each instance depends primarily on the activity of the agent selected, the type of wax employed, and the temperature at which the emulsification is performed. As a result, no minimum numerical ratio can be assigned, and the exact amount can be ascertained in each instance only by experimentation. It has been found, however, that in the case of all commercially available emulsifying agents tested, this minimum corresponds to about 3.5% of emulsifying agent based on the weight of the wax, and is sufficient to cause rapid formation of an emulsion which, after passage through a colloid mill, is stable to storage and to dilution with at least 5 volumes of water. It has further been found that the use of 5% to 7.5% of emulsifying agent, based on the weight of the wax affords excellent results and permits dilution with at least 10 volumes of water, while avoiding the danger of using too little emulsifying agent.

It is unnecessary to use more than the minimum effective amount or about 3.5% of the emulsifying agent when the plastic mixture or the molding compound is essentially non-ionic, but in numerous instances it will prove desirable to use a moderate excess when the plastic mix or molding compound contains acidic or alkaline materials. More than 8% emulsifying agent, based on the weight of the wax, however, generally fails to confer any added stability upon the dispersions while impairing the properties of the materials treated therewith. As a result it is generally preferred to form the emulsion in the presence of between 5% and 7.5% of emulsifying agent, based on the weight of the wax.

The amount of water employed in the emulsification is not critical, but should be sufficient to yield a fluid emulsion of the oil-in-water type. As a practical matter the final emulsion will preferably contain from about 40% to 65% water, the balance consisting principally of the wax and the emulsifying agent. The dispersions may be used as prepared or may be diluted with water, as may be desired.

The dispersions are blended with or incorporated into the finely divided particulate matter by adding an appropriate amount of the dispersion to the particulate matter in a heavy duty mixer which ordinarily is of the dough mixer or Banbury type, and continuing the mixing until a homogeneous blend is obtained.

In the case of materials which do not form plastic, cohesive mixtures with water, such as powdered glass and metallic oxides including iron oxide, no advantage is usually obtained by the addition of water and the blending is essentially a moist blending, the wax dispersion being generally added in the concentrated form in which it is prepared. After mixing is complete, the moist blend is dried, sieved, and molded under pressure.

Disintegrated clays and similar finely divided materials which yield plastic mixes when milled with water may and frequently are treated in the same manner to yield dry moldable powders. Where, however, the articles are to be formed by shaping, the wax dispersion may be incorporated into a previously prepared plastic mixture of the clay, or the plastic mixture may be formed by milling a moist wax-containing clay blend with water.

The amount of emulsified or dispersed wax added to the particulate material depends chiefly upon the type and degree of improvement desired and upon the type of article which it is desired to produce. In the case of molding compounds, a distinct improvement in mold flow or lubrication is noted when as little as 1% wax is added based on the weight of the particulate material, while the addition of 5%–15% causes a marked improvement in the release of the molded articles from the mold, particularly in the case of deep pressings such as clay flower pots, and in the green strength of the articles themselves.

In the case of plastic clay mixes intended for machining, ½% of wax provides a distinct improvement in lubrication during machining as well as better green strength. Substantially more, for example 6%–10%, based on the weight of the clay, yields much better results. Since a wide variety of devices exist for forming plastic clay and dry powders into shapes, and since these devices operate at widely differing temperatures and pressures, the proportion of wax which should be added is primarily a function of these variables and cannot be determined numerically in every instance.

The invention has been disclosed above. The following specific examples illustrate the invention without being in any way limitations thereon. Parts are by weight unless otherwise noted.

*Example 1*

54 parts of water, 1.5 parts of Nonisol 100 (a polyethylene glycol ester of lauric acid) and 1.0 part of Onyxol 9162 (a diethanolamine condensate of cocoanut fatty acids) were mixed and heated to 150° F. To this was slowly added with rapid agitation 43.5 parts of melted scale wax (M. P. 122°–125° F., Dieterts hardness 35/40). After all the wax had been added the resulting emulsion was passed, without cooling, through a colloid mill wherein the size of the wax droplets was reduced to 1 to 2 microns or less.

The emulsion was stable to dilution with 10 parts of water, and to dilute acid and alkali. The weight of the two dispersing agents was 5.8% of the weight of the wax.

*Example 2*

The procedure of Example 1 was repeated, using the following materials:

| | Parts |
|---|---|
| Paraffin wax, M. P. 133–135° F | 36.85 |
| Crude Montan wax (M. P. 175° F.) | 4.09 |
| Stearic acid | 1.25 |
| Casein | 0.40 |
| Sodium pentachlorophenate | 0.16 |
| Triethanolamine | 1.25 |
| Water | 56.00 |
| Total | 100.00 |

The paraffin and montan waxes were mixed and melted, and added with rapid stirring to the water at 165° F. containing the other ingredients. The resulting emulsion was homogenized. The weight of the dispersing agents was 7.1% of the weight of the wax.

*Example 3*

The procedure of Example 2 was repeated, using the following materials:

| | Parts |
|---|---|
| Paraffin wax, M. P. 135° F | 14.00 |
| Hydrogenated castor oil triglyceride | 14.00 |
| Octadecanol | 0.25 |
| Polyvinyl alcohol, 51-05 | 1.00 |
| Polyvinyl alcohol, 50-42 | 0.25 |
| Sodium lauryl sulfate | 0.50 |
| Water | 70.00 |
| Total | 100.00 |

In this formulation, the octadecanol was present as auxiliary stabilizer and the emulsifying agents were the polyvinyl alcohol and the lauryl sulfate.

The paraffin wax and the castor oil triglyceride were mixed and melted, and slowly run into water at 150° F. containing the other ingredients. After passage through a colloid mill an emulsion was obtained which had a particle size of 0.5–2.0 microns and which exhibited excellent stability to dilute acids and alkalis, and was stable to dilution with 5 parts of water. When this emulsion, diluted with water to 15% solids, was kneaded into a plastic kaolin-talc ceramic maker's mixture to supply 10% wax, based on the weight of the kaolin, a well-plasticized and well-lubricated plastic was obtained which, when extruded into a rod 1" in diameter, had excellent green strength.

In this dispersion, the weight of emulsifying agents was 6.2% of the weight of the wax.

*Example 4*

The following materials were emulsified according to Example 2.

| | Parts |
|---|---|
| Crude scale wax, M. P. 125° F | 43.29 |
| Stearic acid | 1.25 |
| Casein | 0.40 |
| Sodium pentachlorophenate | 0.16 |
| Triethanolamine | 0.90 |
| Water | 54.00 |
| Total | 100.00 |

The pH of the resulting dispersion was 8–9. Its stability to mechanical treatment and dilution were "excellent" and its stability to acids and alkalis was "satisfactory."

In this dispersion the weight of dispersing agent was 5.9% of the weight of the wax.

*Example 5*

The following materials were emulsified according to the procedure of Example 2.

| | Parts |
|---|---|
| Crude scale wax | 32.02 |
| Montan wax | 10.67 |
| Stearic acid | 1.25 |
| Casein | 0.40 |
| Na pentachlorophenate | 0.16 |
| Triethanolamine | 1.50 |
| Water | 54.00 |
| Total | 100.00 |

The emulsion obtained was substantially the same as the product of Example 4.

In this dispersion the weight of emulsifying agent was 7.4% of the weight of the wax.

I claim:

1. In a method for manufacturing molded articles from finely divided clay and an aqueous wax dispersion, the steps comprising preparing a colloidal aqueous dispersion consisting essentially of (1) a composition of matter chosen from the group consisting of a wax and a mixture of waxes, said composition having a liquefying point between 110° F. and 200° F. and which has been heated to about 10° F. to 20° F. above its liquefying point, (2) at least one dispersing agent selected from the group consisting of the non-ionic and anionic dispersing agents and (3) water, milling said dispersion without cooling until a particle size not exceeding 2 microns is obtained, blending in said clay with said dispersion in proportions sufficient to make a plastic mass, and molding said mixture under pressure to form a shaped article, the weight of dispersion agent in said dispersion being between 3.5% and 8% of the weight of said wax, and the weight of said wax in said dispersion being between 0.5% and 12% of the weight of said clay.

2. A method according to claim 1, wherein the weight of dispersing agent is between 5% and 7.5% of the weight of the wax.

3. In a method for manufacturing molded articles from finely divided clay and an aqueous wax dispersion, the steps comprising preparing a colloidal aqueous dispersion consisting essentially of (1) a composition of matter comprising a mixture of paraffin wax and hydrogenated castor oil triglyceride which has been heated to about 10° F. to 20° F. above its liquefying point, (2) at least one dispersing agent selected from the group consisting of the non-anionic and anionic dispersing agents and (3) water, milling said dispersion without cooling until a particle size not exceeding 2 microns is obtained, blending in said clay in proportions sufficient to make a plastic mass, and molding said mixture under pressure to form a shaped article, the weight of dispersing agent in said disperse being between 3.5% and 8% of the weight of said wax in said dispersion being between .5% and 12% of the weight of said clay.

References Cited in the file of this patent

UNITED STATES PATENTS

| | | |
|---|---|---|
| 1,979,016 | Sexton | Oct. 30, 1934 |
| 2,456,595 | Rood | Dec. 14, 1948 |
| 2,520,900 | Frost | Sept. 5, 1950 |
| 2,563,499 | Smith | Aug. 7, 1951 |
| 2,605,300 | Shriland | July 29, 1952 |

OTHER REFERENCES

"Commercial Waxes," Bennett, Chemical Publ. Co., Brooklyn, N. Y., 1944, pages 22 and 330.